(12) United States Patent
Kozakaya

(10) Patent No.: US 8,086,027 B2
(45) Date of Patent: Dec. 27, 2011

(54) IMAGE PROCESSING APPARATUS AND METHOD

(75) Inventor: Tatsuo Kozakaya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 12/171,473

(22) Filed: Jul. 11, 2008

(65) Prior Publication Data

US 2009/0262989 A1    Oct. 22, 2009

(30) Foreign Application Priority Data

Jul. 12, 2007    (JP) ................. 2007-183610

(51) Int. Cl.
G06K 9/00 (2006.01)
H04N 1/40 (2006.01)

(52) U.S. Cl. ....................... 382/154; 358/448

(58) Field of Classification Search .......... 382/154, 382/162, 190, 235, 276, 307, 309, 285; 358/3.23, 358/448, 462, 530; 348/211.14, 222.1, 267, 348/571; 902/6
See application file for complete search history.

(56) References Cited

U.S. PATENT DOCUMENTS

| | | | | |
|---|---|---|---|---|
| 7,227,973 | B2* | 6/2007 | Ishiyama | 382/103 |
| 7,593,019 | B2* | 9/2009 | Ishiyama | 345/582 |
| 7,630,539 | B2* | 12/2009 | Ikeda et al. | 382/154 |
| 2006/0269143 | A1 | 11/2006 | Kozakaya | |

FOREIGN PATENT DOCUMENTS

JP       2007-4767       1/2007
WO    WO 2006/138525 A2    12/2006

OTHER PUBLICATIONS

Yuasa, M. et al., "Automatic Facial Feature Point Detection for Face Recognition from a Single Image," The Institute of Electronics, Information and Communication Engineers, Technical Report of IEICE, PRMU 2006-222, vol. 106, pp. 5-10, (2007).
Tomasi, C. et al., "Shape and Motion from Image Streams Under Orthography: A Factorization Method," International Journal of Computer Vision, vol. 9, No. 2, pp. 137-154, (1992).
Notification of Reasons for Refusal issued by the Japanese Patent Office on Sep. 27, 2011, for Japanese Patent Application No. 2007-183610, and English-language translation thereof.

* cited by examiner

*Primary Examiner* — Abolfazl Tabatabai
(74) *Attorney, Agent, or Firm* — Finnegan, Henderson, Farabow, Garrett & Dunner, L.L.P.

(57) ABSTRACT

An image processing apparatus includes an image input unit, a feature point extraction unit which extracts a plurality of feature points from an input image, a three-dimensional model storage unit which stores a three-dimensional model and reference feature point coordinates on the three-dimensional model, a target area setting unit which sets target areas from the three-dimensional model, a correspondence relationship calculation unit which, using the extracted feature points and reference feature points belonging to the target areas, estimates a correspondence relationship between the input image and the target areas, and a three-dimensional model integration unit which integrates target areas related to the image.

8 Claims, 4 Drawing Sheets

IMAGE PROCESSING APPARATUS AND METHOD

CROSS-REFERENCE TO RELATED APPLICATION

This application is based upon and claims the benefit of priority from the prior Japanese Patent Application No. 2007-183610, filed on Jul. 12, 2007; the entire contents of which are incorporated herein by reference.

FIELD OF THE INVENTION

The invention relates to an image processing apparatus and method which construct a three-dimensional model into which is absorbed an individual difference or partial transformation of a recognition object.

DISCRIPTION OF THE BACKGROUND

In order to develop a practical facial image recognition technology, as it is also necessary to properly deal with a non-frontal face or a face whose expression changes, a normalization of a change in an appearance (pattern) of a face with respect to a posture or a transformation has been an important problem. Also, a specialized equipment such as a rangefinder or a stereo device, which directly measures a three-dimensional shape, not being preferable in terms of cost, it is desirable that a process can be started with only one image in order also to broaden an applicable scope.

JP-A-2007-4767 (Kokai) discloses a method of calculating a correspondence relationship between an input image and a three-dimensional model using a plurality of common feature points, to generate a normalized image from only one input image not only for a two-dimensional transformation such as a rotation or size within a screen, but also for a three-dimensional transformation such as a change in a facial posture, and to perform a recognition.

However, there is an influence due to individual differences when a facial image to be processed and the three-dimensional model are not identical. Also, in a case of including a partial transformation such as a smile in a face which is a processing object, as it cannot be expressed with a single three-dimensional model, there has been a possibility of an error occurring in the calculation of the correspondence relationship, and a recognition accuracy decreasing.

As heretofore described, in the conventional technology, there has been a problem that the correspondence relationship between the input image and the three-dimensional model cannot be effectively calculated due to an individual difference or a partial transformation of the face such as a change in facial expression.

SUMMARY OF THE INVENTION

Accordingly, an advantage of an aspect of the invention is to provide an image processing apparatus and method which can calculate a correspondence relationship between a two-dimensional position of an input image and a three-dimensional position of a three-dimensional model.

According to an aspect of the invention, the embodiment is an image processing apparatus including an image input unit which inputs an image of a target object; a storage unit which stores information representing a shape of a three-dimensional model, and three-dimensional positions of a plurality of reference feature points on the three-dimensional model; an extraction unit which extracts a plurality of feature points, which relate to the target object and correspond to the plurality of reference feature points, from the input image; a setting unit which sets target areas, related to the reference feature points, on the three-dimensional model; a calculation unit which, using the extracted feature points and the reference feature points relating to the target areas, obtains a correspondence relationship between two-dimensional positions of the input image and three-dimensional positions of the target areas, for each target area; and a determination unit which, based on the correspondence relationship between the target areas and the input image, determines a correspondence relationship between three-dimensional positions of the three-dimensional model, which correspond to the target areas, and the two-dimensional position of the input image.

DETAILED DESCRIPTION OF THE INVENTION

Hereafter, a description will be given, with reference to the drawings, of an image processing apparatus 10 according to embodiments of the invention.

First Embodiment

Hereafter, a description will be given of an image processing apparatus 10 of a first embodiment, with reference to FIGS. 1 to 4. The image processing apparatus 10 of the embodiment is a recognition apparatus which recognizes a human face.

Figure 1:
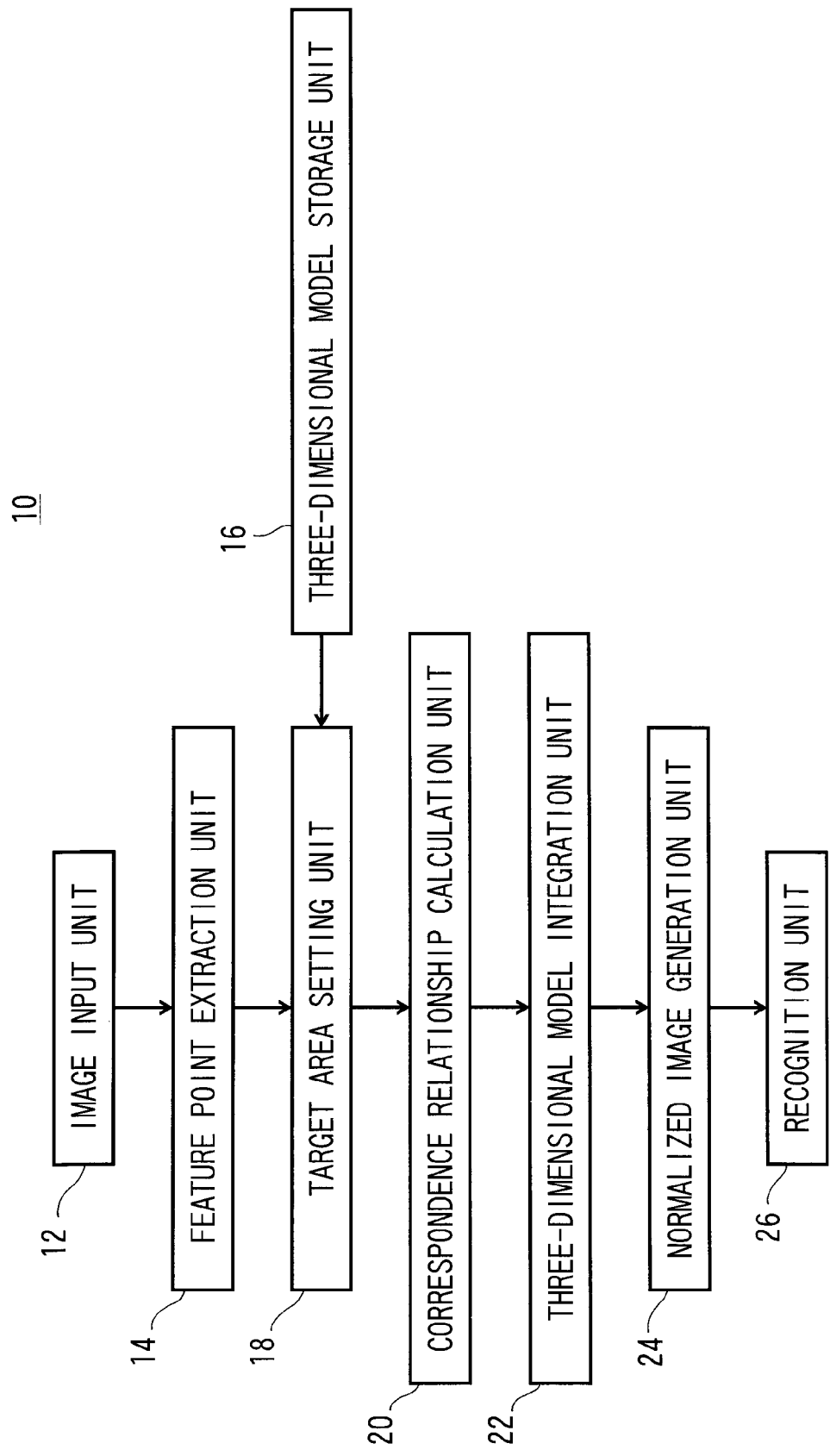
FIG. 1 is a block diagram showing a configuration of an image processing apparatus according to a first embodiment of the invention.

FIG. 1 is a block diagram showing a configuration of the image processing apparatus 10.

The image processing apparatus 10 includes an image input unit 12 which inputs a person's face which is an object, a feature point extraction unit 14 which extracts a plurality of feature points from an input image, a three-dimensional model storage unit 16 which stores a three-dimensional model and reference feature point coordinates on the three-dimensional model, a target area setting unit 18 which sets target areas from the three-dimensional model, a correspondence relationship calculation unit 20 which, based on the extracted feature points and reference feature points belonging to the target areas, calculates a correspondence relationship between the input image and the target areas, a three-dimensional integration unit 22 which integrates the target areas related with the image, a normalized image generation unit 24 which generates a normalized image based on the three-dimensional model integrated by the three-dimensional model integration unit 22, and a recognition unit 26 which performs a pattern recognition based on the normalized image and on dictionary information of the target object stored in advance and performs a recognition of the input image.

A function of each unit 14 to 26 can also be actualized by a program stored in a computer readable medium, which causes a computer to perform the following process.

Figure 2:
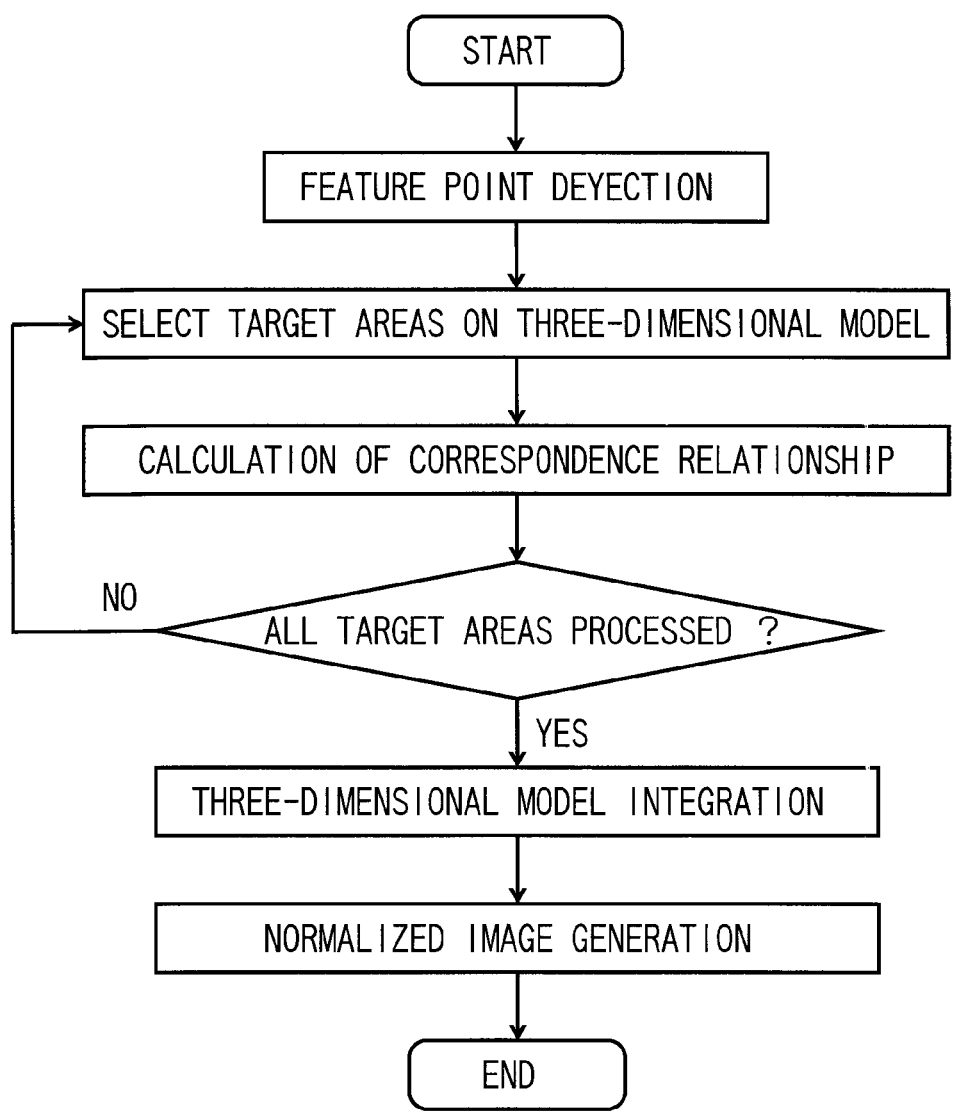
FIG. 2 is a flowchart of the image processing apparatus.

Next, a description will be given of an operation process of the image processing apparatus 10, with reference to FIG. 2.

The image input unit 12 inputs a facial image which is a processing object. The image obtained by the image input unit 12 is subsequently sent to the feature point extraction unit 14.

A USB camera, a digital camera or the like may be used as a device configuring the image input unit 12. Also, a recording device, a video tape, a DVD or the like which stores facial image data captured and stored in advance, and a scanner which scans a photograph of a face may also be used. The image is inputted by way of a network or the like.

In the feature point extraction unit 14, coordinates of facial regions in the image are detected as facial feature points.

A method described in Yuasa, Takeguchi, Kosakatani and Yamaguchi, "Automatic Facial Feature Point Extraction for Still Image Face Recognition," Shingaku Technical Report PR MU2006-222, pp. 5-10, 2007) may be used to detect facial feature points, but the invention is not limited to this method.

Any regions of the face are acceptable as feature points to be detected, such as pupils, eyebrows, nostrils or mouth corners, as long as they are four or more points which do not exist on an identical plane.

However, herein, as the extracted feature points are used as reference points in the case of the correlation, it is desirable that the feature points exist in a vicinity of target areas intended to be referred to.

Three-dimensional face information and the reference feature point coordinates are stored in the three-dimensional model storage unit 16. The three-dimensional face information is three-dimensional position information configuring a stereoscopic model of the face. Also, kinds of the feature points extracted by the feature point extraction unit 14 are also included in information of the reference feature point coordinates.

For example, in a case where the pupils, eyebrows, nostrils and mouth corners have been extracted by the feature point extraction unit 14, at least the pupils, eyebrows, nostrils and mouth corners are also included in the reference feature points.

Also, the three-dimensional face information may be an average shape, which is created from facial shapes of a plurality of persons, or a general shape such as represents a general face or, in the event that a facial shape of each individual has been obtained, it is also acceptable to use them.

Also, the three-dimensional model storage unit 16 may store a plurality of the three-dimensional models or reference feature points.

In the target area setting unit 18, optionally defined local target areas are set for the three dimensional model held by the three-dimensional model storage unit 16. This setting is carried out in such a way that the facial feature points belong to the target areas.

Although there is no particular limitation on a position or size of the target areas, in the event that there are less facial feature points belonging to the target areas, there is a possibility of the correspondence relationship calculation in a subsequent stage becoming unstable. For this reason, it can be supposed that a balance between the size of the areas and a number of constituent feature points is important.

Figure 3:
FIG. 3 shows an example of a target area setting.

For example, a total of five target areas (i.e., areas of an upper and a lower half and a left and a right half, into which the three-dimensional model is divided, and a whole face area), as shown in FIG. 3. The target area may be set for each facial part such as an eye, a nose or a mouth.

Also, the target areas may or may not overlap each other.

The facial feature points belonging to the target areas do not necessarily have to exist in the target areas. For example, in a case of setting a target area with respect to a vicinity of an eye, a feature point such as a mouth corner point may be used, and it is sufficient that the target area and the facial feature point are related.

Also, it is possible to optionally combine these feature points belonging to the target area.

In the correspondence relationship calculation unit 20, a correspondence relationship with the face on the input image is calculated for each target area set by the target area setting unit 18.

Although the correspondence relationship may be obtained in any way, herein, a description will be given, as an example, of a method of obtaining a projection matrix which represents a correspondence relationship between an input image and feature points on the three-dimensional model.

Firstly, when taking a total number of target areas set on the three-dimensional model to be M, a number of feature points belonging to an ith target area being taken to be Ni, it is taken that the same number of corresponding feature points have been detected for the input image. At this time, taking a measurement matrix Wi as 2×Ni matrices, and a shape matrix Si as 3×Ni matrices, Wi and Si can be defined by Equation (1) below.

$$W_i = \begin{bmatrix} u'_{i1} & u'_{i2} & \cdots & u'_{iN_i} \\ v'_{i1} & v'_{i2} & \cdots & u'_{iN_i} \end{bmatrix},$$

$$S_i = \begin{bmatrix} x'_{i1} & x'_{i2} & \cdots & x'_{iN_i} \\ y'_{i1} & y'_{i2} & \cdots & y'_{iN_i} \\ z'_{i1} & z'_{i2} & \cdots & z'_{iN_i} \end{bmatrix}$$

(1)

Herein, $(u_{ij}, v_{ij})$ represents a jth feature point on the input image in the ith target area, and $(u'_{ij}, v'_{ij})$ coordinates in which the feature point centroid is subtracted from the feature point. In the same way, $(x_{ij}, y_{ij}, z_{ij})$ represents an ith reference feature point on a three-dimensional shape model, and $(x'_{ij}, y'_{ij}, z'_{ij})$ coordinates in which the reference feature point centroid is subtracted from the feature point.

At this time, according to Non-patent Literature 2 (C. Tomasi and T. Kanade, Shape and motion from image streams under orthography: A factorization method. Int. J. of Computer Vision, Vol. 9, No. 2, pp. 137-154, 1992), a motion matrix Mi can be expressed by Equation (2) below, using the measurement matrix Wi and the shape matrix Si.

$$W_i = M_i S_i \quad (2)$$

In Equation (2), by multiplying a generalized inverse matrix S of a shape matrix S from the right, it is possible to calculate a projection matrix Mi to be obtained.

By calculating the projection matrix Mi with respect to each of the M target areas set in the target area setting unit 18, a correspondence relationship of each target area with the image is calculated.

In the three-dimensional model integration unit 22, the correspondence relationships of the individual target areas with the image, calculated in the correspondence relationship calculation unit 20, are integrated, and fitting is carried out onto the face which is the object, calculating a final three-dimensional model.

Firstly, target areas are selected and, in the event that the projection matrix Mi representing their correspondence relationship with the input image can be obtained, it is possible, from Equation (3) below, to calculate a mapping from coordinates on the three-dimensional model to coordinates on the input image.

$$\begin{bmatrix} u_{ij} \\ v_{ij} \end{bmatrix} = M_i \begin{bmatrix} X_{ij} - \bar{x}_i \\ Y_{ij} - \bar{y}_i \\ Z_{ij} - \bar{z}_i \end{bmatrix} + \begin{bmatrix} \bar{u}_i \\ \bar{v}_i \end{bmatrix} \quad (3)$$

where $(X_{ij}, Y_{ij}, Z_{ij})$ represents coordinates on a three-dimensional model included in an ith target area, $(u_{ij}, v_{ij})$ coordinates on a corresponding image, and $(\bar{u}_i, \bar{v}_i)$ and $\bar{x}_i, \bar{y}_i, \bar{z}_i$ centroids of reference feature point coordinates of an image and a three-dimensional model, respectively.

Points from the final three-dimensional model corresponding to the input image can be obtained by means of a weighting addition of the mapped coordinates $(u_{ij}, v_{ij})$ shown in Equation (4).

$$(u_j, v_j) = \sum_{i=1}^{M} w_{ij}(u_{ij}, v_{ij}) \quad (4)$$

However, $w_{ij}$, being a weight set for each coordinate set on the three-dimensional model configuring each target area, is a value which fulfills a constraint (that is, $\Sigma w_{ij}=1$) that a sum of weights added to the individual target areas is 1 (i=1 to M).

This weight is used, when mapping coordinates in a vicinity of a boundary of a certain target area, to suppress an inconsistency with a result of a mapping of another adjacent target area.

Figure 4:
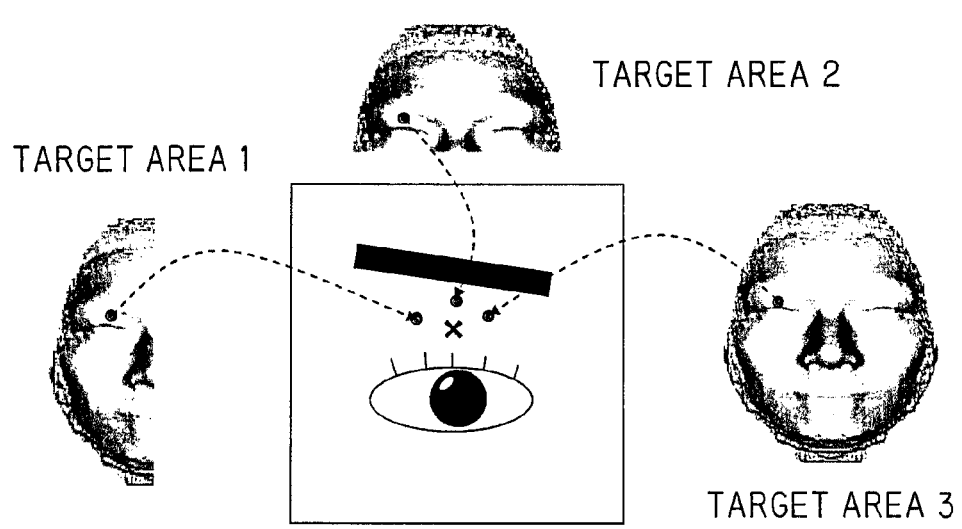
FIG. 4 is a conceptual diagram of a three-dimensional model integration process.

FIG. 4 shows an example of integrating the corresponding points calculated one for each target area.

Firstly, with respect to identical coordinates (in FIG. 4, a vicinity of an eyelid) common to the individual target areas, corresponding points on the input image are calculated by Equation (4).

Next, by the corresponding points on the input image being subjected to a weighting addition, a final corresponding point on the input image with respect to the points in the vicinity of the eyelid of the three-dimensional model of FIG. 4 previously described is determined (in FIG. 4, expressed by the x mark).

Next, by applying this to all points on the three-dimensional model, it is possible to obtain corresponding points on the input image with respect to all the points configuring the three-dimensional model.

At this time, apart from weighting and integrating coordinates, a method can also be considered which generates a normalized image for each target area, and subsequently weights and integrates pixel values. This is equivalent to simply applying the method described in Patent Literature 1 a plurality of times per target area, and subjecting the generated normalized images to a weighting addition.

This method is tentatively called an "image based integration". Although the integration method used in the embodiment and the image based integration are seemingly similar, it is necessary to note that finally obtained normalized images differ widely.

This is because it can be hoped that, in the event that the three-dimensional model can approximately represent an input shape, basically, no gross error occurs between coordinate values on the input image, calculated one for each target area, and true corresponding points. However, as the pixel values do not necessarily attain continuous values, there is a possibility that the values fluctuate widely due merely to the coordinates deviating slightly.

For example, in the case of calculating the corresponding points in the vicinity of the eyelid of FIG. 4, in the event that an error occurs in a coordinate calculation, and the corresponding points are related to points on an eyebrow, the pixel values change widely from an original skin color to a color of the eyebrow. Also, even by obtaining a weighting addition of the pixel values, it is not possible to suppress an effect of an error in the pixel values.

As opposed to this, according to the method of the embodiment, by carrying out a weighting addition with pixel values as a reference, it is possible to perform a final three-dimensional model integration process without depending on a correlation error for each target area.

Also, as an advantage which should be noted from a viewpoint of a comparison with Patent Literature 1, a point can be raised in that, in the event that a hidden portion is generated in an input face due to a postural change or the like, a more reliable process is possible by calculating a correspondence relationship for each target area. For example, there is a case in which, for the reason that the face is turning left or right, or the like, an outer corner of an eye, among the feature points, cannot be effectively extracted from the image, or a detection error occurs.

At this time, on calculating the correspondence relationship by means of a single three-dimensional model, using all feature points, in the conventional way, the error in the detection of the outer corner of the eye affects a whole of the correlation. Meanwhile, according to the method of the embodiment, as the three-dimensional model is configured of the plurality of target areas, even in the event that there are detection errors in some feature points, the errors do not spread to the other target areas. Consequently, in comparison with the method of Patent Literature 1, it is possible to perform a more reliable process against a detection error caused by a hiding or the like.

The weighting addition coefficient $W_{ij}$ may be predetermined for each target area.

Also, the weighting addition coefficient $W_{ij}$ may be changed in accordance with a degree of feature point detection reliability.

Also, the degree of feature point detection reliability may be calculated based on an error in a matching with the three-dimensional model.

Also, a difference between manually input feature points and automatically detected feature points may be calculated in advance, and the degree of reliability is predetermined for each feature point, based on a standard deviation of the difference.

In a case of obtaining the degree of reliability for each feature point, the degree of reliability in a target area by be obtained by means of, for example, a mean value, a maximum value or the like of the degrees of reliability of the individual feature points.

By adaptively setting these weights, it is possible to adjust a degree of compliance with a local transformation of the three-dimensional model with respect to the input image.

In the normalized image generation unit 24, normalized images are generated based on a positional correspondence relationship between the three-dimensional model, calculated by the three-dimensional model integration unit 22, and the input image.

It is sufficient to set a pixel value I (u, v) in accordance with coordinates (u, v) on the input image which correspond to a pixel value IM (X, Y, Z) in coordinates (X, Y, Z) on the three-dimensional model.

Also, while the calculated coordinates (u, v) on the input image are real numbers, in a case where the pixel value of the input image is set only to discrete (integer-valued) coordinates, by sub-pixel estimating (re-sampling) the pixel value of (u, v), it is also possible to calculate a more accurate pixel value.

Regarding the re-sampling, there existing a great variety of methods, for example, a nearest neighbor method, which simply rounds fractional portions of (u, v) down and assigns the rounded (u, v), a bi-linear method and the like are well known. Other re-sampling method may also be used.

The recognition unit 26 performs a process of recognizing the normalized image (a face pattern), obtained by the normalized image generation unit 24, and a registration dictionary stored in advance.

The face pattern in which a posture and a transformation are normalized having been obtained by the normalized image generation unit 24, as the facial regions are obtained as the reference feature points, in the recognition unit 26, it is possible to apply an optional pattern recognition method proposed so far.

For example, by using a well-known unique face method or the like, it is also possible to perturb and clip feature points, generate a plurality of face patterns, analyze principle components, and calculate degrees of similarity to registered subspaces. Degrees of similarity between the subspaces can be calculated by means of a mutual subspace method in Non-patent Literature 2, or the like.

Also, an optional feature extraction process is applicable to the generated face patterns. For example, by using a histogram flattening process, a vertical differentiation process, a Fourier transformation or the like, more essential information the face patterns have being extracted, it is possible to improve a recognition accuracy.

Also, even in the event that there has been an input of a plurality of images, it is possible to integrate the generated plurality of face patterns in the recognition unit 26, and perform the recognition process. At a time of this integration, it is also possible to integrate the plurality of face patterns as one feature quantity, and it is also possible to integrate degrees of similarity after calculating the plurality of face patterns as a plurality of feature quantities.

Also, by carrying out a recognition by extracting a plurality of feature quantities from one face pattern by carrying out different feature extraction processes, it is possible to capture a greater variety of features, and perform a recognition.

In this way, according to the image processing apparatus 10 of the embodiment, a more precise recognition is possible by setting a plurality of target areas for the three-dimensional model, calculating a correspondence relationship with the input image for each of the individual target areas, obtaining one three-dimensional model integrated onto the image using the converted coordinate values, and generating a normalized image flexibly adapted also to an individual difference or partial transformation of an input face.

Second Embodiment

A description will be given of an image processing apparatus 10 of a second embodiment.

In the first embodiment, a description has been given of the method of setting the plurality of target areas from one three-dimensional model in the target area setting unit 18 but, in this embodiment, the target areas are set from a plurality of kinds of three-dimensional models.

Generally, any three-dimensional model local areas may be used for the target areas but, furthermore, an identical three-dimensional model may not used for the local areas.

For example, when setting an eye, a nose, a mouth and the like as the local areas, it is also possible to use separate three-dimensional models and reference feature points. At this time, any method may be utilized for a selection of three-dimensional models to be used, but the following method may also be used.

After calculating a correspondence relationship between the input image and the target areas, a three-dimensional model may be selected. In the three-dimensional model, a distance is shortest between a feature point on the input image and a point at which a reference feature point has been mapped onto the image.

A three-dimensional model may be selected based on parameters such as a race, a sex, an age and the like.

A pattern of the input image may also be selected to select a most suitable three-dimensional model Three-dimensional models separately constructed by means of a linear combination of a plurality of three-dimensional models, or by a generative means such as a mesh transformation may be utilized.

Three-dimensional models for one certain target area, that is, select three-dimensional models may be used in such a way that items of positional information configuring the target areas are identical, but the three-dimensional models are different. This refers to, for example, a condition in which local areas representing a vicinity of an eye are selected by means of the plurality of three-dimensional models.

According to this embodiment, by optionally selecting a three-dimensional model for each target area, it being possible to more accurately represent a partial transformation or the like of an input object which cannot be represented with one three-dimensional model, it is possible to improve an accuracy of a finally integrated three-dimensional model.

Third Embodiment

A description will be given, with reference to FIG. 5, of an image processing apparatus 10 of a third embodiment.

In the first embodiment, the recognition is carried out by generating the normalized images utilizing the correspondence relationship between the image obtained by the three-dimensional model integration unit 22 and the three-dimensional model, but it is also possible to utilize this correspondence relationship to convert an input face into another face by means of the image conversion unit 28, to be described hereafter.

Figure 5:
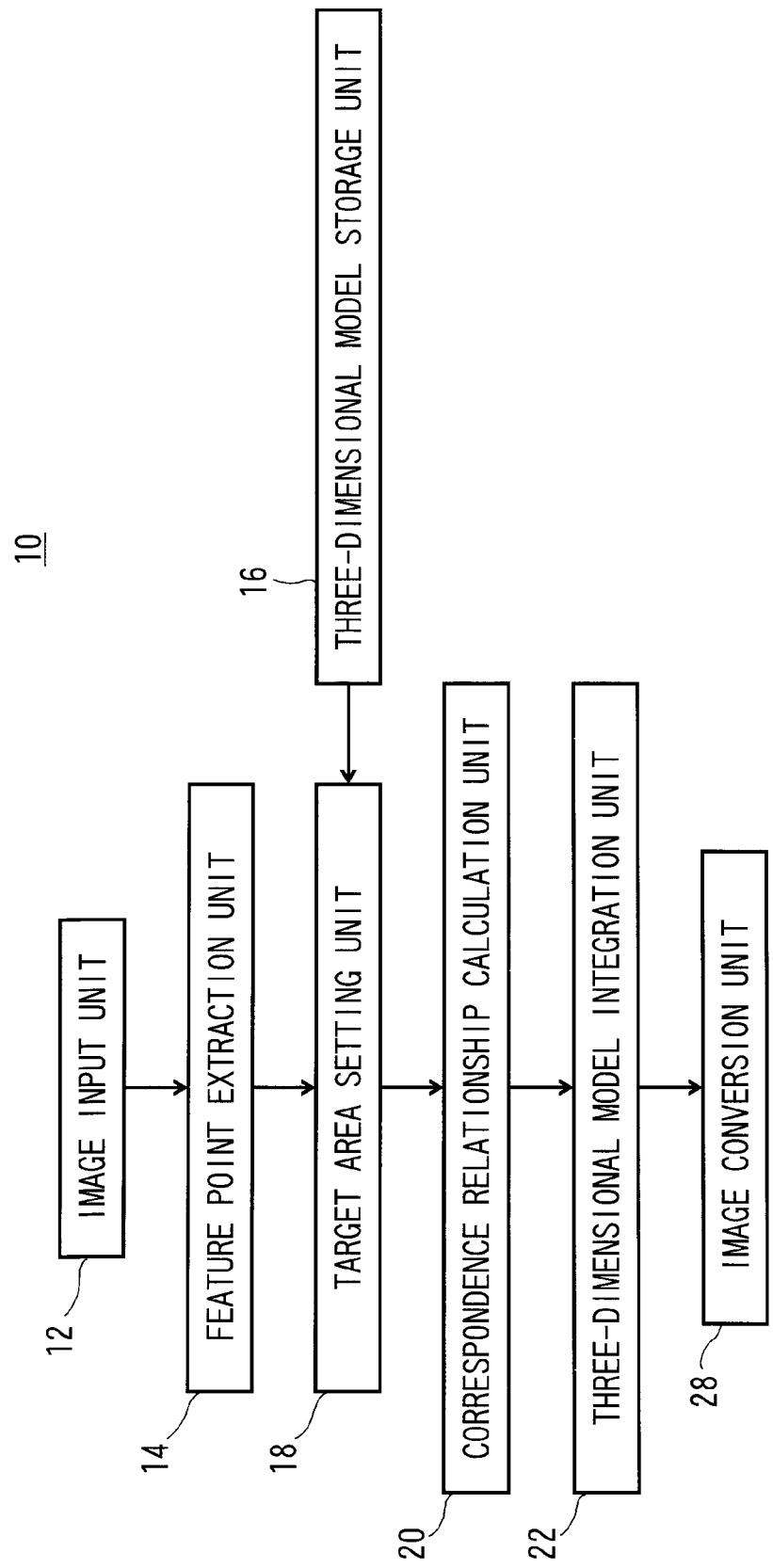
FIG. 5 is a block diagram showing a configuration of an image processing apparatus according to a third embodiment.

FIG. 5 shows a configuration of the image processing apparatus 10 according to this embodiment.

The image processing apparatus 10 of this embodiment is the same as that of the first embodiment up to the three-dimensional model integration unit 22, but differs in that, in order to perform the conversion of the image, two or more images are input, and three-dimensional model integration processes are carried out separately. Hereafter, a description will be given of the image conversion unit 28 in a subsequent stage, taking it that two images are input, and three-dimensional model integration processes are complete.

The image conversion unit 28, utilizing three-dimensional models calculated by the three-dimensional model integration unit 22, performs a process of converting an input facial image into another facial image.

Supposing that two integrated three-dimensional models (taken to be a model 1 and a model 2) have been obtained, as the correspondence relationship between the three-dimensional models is known, it is possible to optionally perform a conversion of pixel values.

Firstly, in the model 1, colors of individual vertices configuring the three-dimensional model are obtained in advance (the same process as that of the normalized image generation unit 24), and the colors are stored as color information of the same vertices of the model 2.

Next, by carrying out this process for all the vertices of the model 1 and model 2, geometric positional information of the model 2 remains the same as it is, and only the color information of the model 2 becomes identical to that of the model 1.

Next, as the model 2 is related to the input image, the positional relationship on the image with the vertices of the model 2 is known. Therein, the changed color information of the model 2 is overwritten on positions on the image indicated by the vertices of the model 2. In the event that feature point positions projected onto the image are separated from one another, an interpolation process is carried out.

By means of these operations, a face of an input image corresponding to the model 2 can be changed to color information of a face of the model 1 while maintaining a face shape of the model 2.

By using the image conversion unit 28, when two image are given, it being possible to mutually convert facial images, it is possible to utilize it for, for example, an avatar or the like on a computer.

Also, the input image does not always have to be a real-world face. By making one image into a character of a cartoon or the like, and giving it the three-dimensional models, the reference feature points, and the correspondence relationship between the models in advance, it is possible to perform a conversion between the facial image and the character of the cartoon or the like by means of the heretofore described method.

Also, as an accurate correspondence relationship between the image and the three-dimensional models is known, it is also easy to convert only one portion of the face into another image or a character.

A description has been given taking the number of input images to be two, but even by taking it to be an optional number of two or more, the discussion thus far being completely viable, a conversion between optional images is possible.

MODIFICATION EXAMPLE

The invention not being limited to the heretofore described embodiments as it is, in an implementation phase, its components can be transformed and embodied without departing from the scope thereof. Also, by means of an appropriate combination of the plurality of components disclosed in the heretofore described embodiments, it is possible to form various kinds of invention. For example, it is also acceptable to eliminate some components from all the components shown in the embodiments. Furthermore, it is also acceptable to appropriately combine components over different embodiments.

What is claimed is:

1. An image processing apparatus, comprising:
an image input unit which inputs an image of a target object;
a storage unit which stores information representing a shape of a three-dimensional model and three-dimensional positions of a plurality of reference feature points on the three-dimensional model;
an extraction unit which extracts a plurality of feature points, which relate to the target object and correspond to the plurality of reference feature points, from the input image;
a setting unit which sets target areas, related to the reference feature points, on the three-dimensional model;
a calculation unit which, based on the extracted feature points and the reference feature points relating to the target areas, calculates a correspondence relationship between two-dimensional positions of the input image and three-dimensional positions of the target areas, for each target area; and
a determination unit which, based on the correspondence relationship between the target areas and the input image, determines a correspondence relationship between three-dimensional positions of the three-dimensional model, which correspond to the target areas, and the two-dimensional position of the input image.

2. The apparatus according to claim 1, wherein
the correspondence relationship of each target area is a projection matrix between the extracted feature points and the reference feature points of the target areas.

3. The apparatus according to claim 2, wherein
the determination unit, based on the projection matrix of each target area, projects the individual target areas onto the input image, and determines the correspondence relationship between the three-dimensional positions of the three-dimensional model and the two-dimensional positions of the input image by weighted summation of the projected positions of each target area.

4. The apparatus according to claim 1, wherein
the storage unit stores a plurality of the three-dimensional models, and
the setting unit sets at least one target area for each of the plurality of three-dimensional models.

5. The apparatus according to claim 1, further comprising
an image generation unit which based on the correspondence relationship between the three-dimensional positions of the three-dimensional model, which correspond to the target areas, and the two-dimensional position of the input image, generates a normalized image from the input image; and
a recognition unit which performs a pattern recognition based on the normalized image and on dictionary information of the target object stored in advance, and performs a recognition of the input image.

6. The apparatus according to claim 1, further comprising
an image conversion unit which, based on the correspondence relationship between the three-dimensional positions of the three-dimensional model, which correspond to the target areas, and the two-dimensional position of the input image, converts the target object of the input image into another target object.

7. An image processing method, comprising:
inputting an image of a target object;
storing information representing a shape of a three-dimensional model and three-dimensional positions of a plurality of reference feature points on the three-dimensional model;
extracting a plurality of feature points, which relate to the target object and correspond to the plurality of reference feature points, from the input image;
setting target areas, related to the reference feature points, on the three-dimensional model;

calculating, based on the extracted feature points and the reference feature points relating to the target areas, a correspondence relationship between two-dimensional positions of the input image and three-dimensional positions of the target areas, for each target area; and determining, based on the correspondence relationship between the target areas and the input image, determines a correspondence relationship between three-dimensional positions of the three-dimensional model, which correspond to the target areas, and the two-dimensional position of the input image.

8. A program stored in a non-transitory computer readable medium, causing a computer to perform:

inputting function which inputs an image of a target object;

storing information representing a shape of a three-dimensional model, and three-dimensional positions of a plurality of reference feature points on the three-dimensional model;

extracting a plurality of feature points, which relate to the target object and correspond to the plurality of reference feature points, from the input image;

setting target areas, related to the reference feature points on the three-dimensional model;

calculating, based on the extracted feature points and the reference feature points relating to the target areas, obtains a correspondence relationship between two-dimensional positions of the input image and three-dimensional positions of the target areas, for each target area; and determining, based on the correspondence relationship between the target areas and the input image, determines a correspondence relationship between the three-dimensional positions of the three-dimensional model, which correspond to the target areas, and the two-dimensional position of the input image.

* * * * *